United States Patent
Haunstein et al.

(10) Patent No.: US 7,266,311 B2
(45) Date of Patent: Sep. 4, 2007

(54) CONTROL OF DELAY LINE INTERFEROMETER

(75) Inventors: Herbert Haunstein, Bavaria (DE); Ralph Schlenk, Bavaria (DE)

(73) Assignee: Lucent Technologies Inc., Murray Hill, NJ (US)

( * ) Notice: Subject to any disclaimer, the term of this patent is extended or adjusted under 35 U.S.C. 154(b) by 526 days.

(21) Appl. No.: 10/954,108

(22) Filed: Sep. 29, 2004

(65) Prior Publication Data

US 2006/0067703 A1 Mar. 30, 2006

(51) Int. Cl.
*H04B 10/06* (2006.01)

(52) U.S. Cl. .................. 398/209; 398/27; 398/189; 398/204

(58) Field of Classification Search .............. 398/27, 398/189, 198, 204, 205, 206, 208, 209
See application file for complete search history.

(56) References Cited

U.S. PATENT DOCUMENTS

| | | | | |
|---|---|---|---|---|
| 6,175,320 | B1 * | 1/2001 | Heflinger | 341/137 |
| 6,271,959 | B1 * | 8/2001 | Kim et al. | 359/325 |
| 2005/0047780 | A1 * | 3/2005 | Hoshida et al. | 398/33 |

FOREIGN PATENT DOCUMENTS

| | | |
|---|---|---|
| DE | 103 49 736.6 | 10/2003 |
| EP | 1 056 230 A2 | 11/2000 |
| EP | 1 335 510 A1 | 8/2003 |
| GB | 2 385 144 A | 8/2003 |

OTHER PUBLICATIONS

E. A. Swanson et al., "High Sensitivity Optical Preamplified Direct Detection DPSK Receiver With Active Delay-Line Stabilization", *IEEE Photonics Technology Letters*, vol. 6, No. 2, Feb. 1994, pp. 263-265.
K. Sticht et al., "Adaptation Of Electronic PMD Equalizer Based on BER Estimation Derived From FEC Decoder", *Proc. 27th Eur. Conf. on Opt. Comm. (ECOC'01*—Amsterdam), We.P.39, pp. 454-455.
J. Salz et al., "Double Error Rates In Differentially Coherent Phase Systems", *IEEE Transactions on Communications Systems*, vol. 12, No. 12, Jun. 1964, pp. 202-205.
H. Kim et al., "Robustness to Laser Frequency Offset in Direct-Detection DPSK and DQPSK Systems", *Journal of Lightwave Technology*, vol. 21, No. 9, Sep. 2003, pp. 1887-1891.
K-P. Ho, "The Effect Of Interferometer Phase Error On Direct-Detection DPSK and DQPSK Signals", *IEEE Photonics Technology Letters*, vol. 16, No. 1, Jan. 2004, pp. 308-310.
Haunstein et al., "Control of Combined Electrical Feed-Forward and Decision Feedback Equalization By Conditional Error Counts From FEC in the Presence of PMD", *Proc. OFC '03*, vol. 2, paper ThG5, pp. 474-475.

* cited by examiner

*Primary Examiner*—Christina Leung

(57) ABSTRACT

The delay setting of an optical delay line interferometer (DLI) used to decode differentially encoded phase shift keyed signals (DPSK or DQPSK) is controlled using a control signal representative of the ratio $P_{err2}/P_{err1}$ of the rate of occurrence of double errors and the rate of occurrence of errors. The ratio $P_{err2}/P_{err1}$, as the delay setting of the DLI is varied, exhibits a characteristic W-shaped structure consisting of a local maximum at the optimum value and two minima adjacent to the maximum, one on each side of it. This structure is present over a wide range of signal to noise ratio and residual dispersion.

12 Claims, 4 Drawing Sheets

CONTROL OF DELAY LINE INTERFEROMETER

TECHNICAL FIELD

This invention relates to data transmission via optical signals, and especially to a method and device for automatic control of a delay line interferometer.

BACKGROUND OF THE INVENTION

The need for bandwidth and reach in optical transmission has given rise to a need to use more advanced modulation formats. While, at the present, amplitude modulation is still the predominant format, advanced modulation formats often make use of phase modulation. Among the advanced modulation formats that are likely to be implemented first, owing to their simplicity, are optical duobinary (ODB), differential phase shift keying (DPSK), and differential quadrature phase shift keying (DQPSK).

For some modulation formats (such as ODB, DPSK and DQPSK), a logical exclusive-OR (or modulo 2 addition) is necessary in the modulator or demodulator. As the implementation of such a device in the electrical domain gives rise to difficulties, it has been proposed to implement such a function in the optical domain using an optical delay line interferometer (DLI).

An optical DLI is a simple device in principle. An incoming optical signal is split into two paths. The signal in one path is delayed by a time corresponding to one bit and the signals in the two paths are coherently re-combined. Generally, the splitting and the re-combination are each performed in a respective optical 3dB coupler, in which case the DLI has two outputs, corresponding to the coherent sum and difference respectively of the optical signal and the delayed optical signal. Thus, if the optical signal and the delayed optical signal are in phase, the sum output will be comparable in magnitude with the original optical signal whereas the difference output will be approximately zero, whereas if the signals are $\pi$ radians out of phase the difference output will be comparable in magnitude with the original optical signal whereas the sum output will be approximately zero. If the DPSK signal is coded so that a phase change of $\pi$ radians corresponds to a digital '1' and a zero phase change corresponds to a digital '0' the sum output of the DLI, when the DLI is correctly aligned, is an ODB optical signal corresponding to the complement of the data. The detected outputs are applied to respective inputs of a differential amplifier to obtain the received data signal. Thus, an optical DLI can, in principle, act as a decoder for optical DPSK signals, or it can be used to produce ODB signals.

Similarly, a decoder for optical DQPSK signals can, in principle, be constructed using two DLIs, of which one has a delay of one symbol in the delayed path, as for the DPSK detector, and the other has a delay of one symbol plus a phase shift of $\pi E/2$ radians.

Since interferometers rely for their operation on the constructive/destructive interference between two optical fields, a DLI is particularly sensitive to the setting of the delay. Since the delay is dependent on temperature, laser frequency variation, polarization state etc. and must be set accurately, it is necessary in a commercial system to employ an automatic control.

The normal methods of providing automatic control in receiver equipment do not readily transfer to the control of the delay in a DLI, or else they involve substantial extra expense.

E. Swanson et al., 'High Sensitivity Optically Preamplified Direct Detection DPSK Receiver with Active Delay-Line Stabilization', *IEEE Photonics Technology Letters*, vol. 6, pp. 263-265, Feb. 1994, addresses an automatic control for the stabilization of the optical delay line interferometer, but this solution requires the carrier to be present in the transmitted spectrum. This requires a degree of deliberate misalignment of the phase modulation, in that instead of the phase difference between consecutive bits being 0 or $\pi$, it is 0 or slightly less than $\pi$, which results in a degraded signal or additional penalty.

German patent application No. 10 349 736.6 proposes using the RF-power after the differential amplifier as feedback signal for a control loop. Although this is a highly effective method, it involves additional RF detection circuitry that adds to the overall costs.

K. Sticht et al., 'Adaptation of electronic PMD equaliser based on BER estimation derived from FEC decoder', in *Proc. ECOC'01*, Paper WeP39, Amsterdam, 2001, disclose controlling a polarization mode dispersion equalizer, and also the sampling phase in an amplitude-modulation optical receiver using the bit error rate (BER) as determined by a forward error correction (FEC) decoder as a feedback signal. This is a very cost-effective method since, in practice, receivers need to incorporate FEC decoding in any case, so this does not represent significant extra cost, as it only involves slight modification or addition to existing apparatus, needed for one purpose, to adapt it to a second use. It would, in principle, be possible to apply this to the control of the delay in a DLI in an optical receiver. Although FEC control can be implemented easily, however, there is a problem, since the delay value is just one of several variables that need to be controlled, and all of them affect the BER, which is precisely why they do need to be controlled. This means that optimization of BER involves a number n of control variables, (n>1). This is an especially severe problem during startup, since an n-dimensional space has to be covered to find the optimum bit error rate, which slows down the process.

SUMMARY OF THE INVENTION

A method according to the invention of controlling the delay setting of an optical delay line interferometer used to decode differentially encoded phase shift keyed signals comprises determining the rate of occurrence of errors $P_{err1}$ in the decoded signals, determining the rate of occurrence of double errors $P_{err2}$ in the decoded signals, deriving a control signal representative of the ratio $P_{err2}/P_{err1}$ of the determined rates and using said control signal to control said delay setting.

An embodiment of the present invention is a technique that makes use of FEC decoders, thereby reducing cost by reusing apparatus, and, at the same time, solves the startup time problem. Additional information available from the FEC decoder, in addition to simple error counts, is used for that purpose.

BRIEF DESCRIPTION OF THE DRAWINGS

Some embodiments of the invention will now be described by way of example with reference to the accompanying drawings, in which.

DETAILED DESCRIPTION

Figure 1:
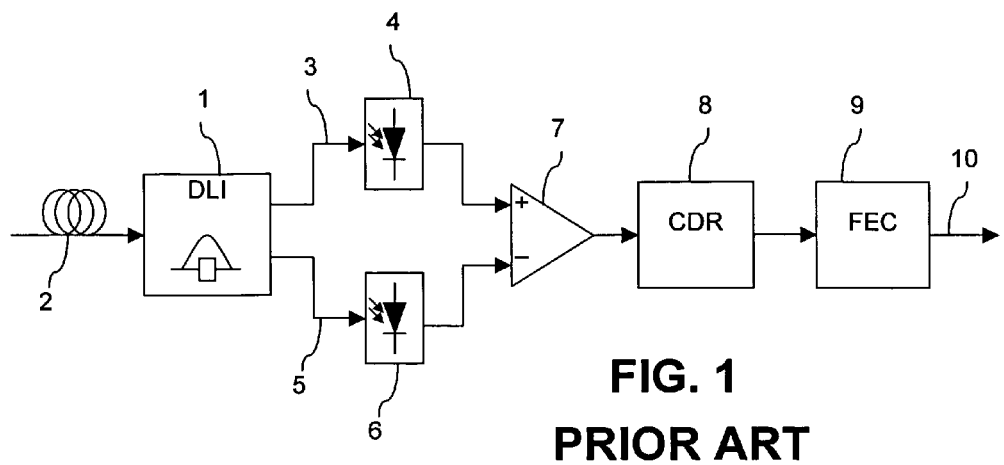
FIG. 1 shows a known DPSK receiver employing a DLI.

FIG. 1 shows the general layout of a receiver for optical DPSK signals. A delay-line interferometer (DLI) 1 is connected to receive optical DPSK signals from an optical fiber link 2. The DLI is constructed on the principles of a Mach-Zehnder interferometer, with one arm incorporating a delay of one bit length of the DPSK signal relative to the other arm.

The DLI has a sum output 3 which provides a signal which is the sum of the optical signal in one bit period with the optical signal in the next bit period, and is therefore of high intensity when there is no phase difference between the optical signals in the two bit periods, and of approximately zero intensity when there is a phase difference of π radians between the two signals. The signal from the sum output 3 is applied to a first photo-detector 4 which detects the signal. The DLI also has a difference output 5 which provides a signal which is the difference between the optical signal in one bit period and the optical signal in the next bit period, and is therefore of approximately zero intensity when there is no phase difference between the optical signals in the two bit periods, and of high intensity when there is a phase difference of π radians between the two signals. The signal from the difference output 5 is applied to a second photo-detector 6 which detects the signal. Thus the first and second photo-detectors 4 and 6 provide complementary electrical signals corresponding to the data encoded on the optical DPSK signals.

The electrical signals from the first and second photo-detectors 4 and 6 are supplied to respective inputs of a differential amplifier 7 which combines the two complementary electrical signals, thus providing a 3dB advantage.

The output of the differential amplifier 7 is supplied to conventional clock and data recovery (CDR) circuitry 8 to provide a recovered clean data signal corresponding to the data encoded on the DPSK optical signal.

Since the data encoded on the DPSK optical signal is conventionally encoded with an error correction code, the clean data signal recovered by the CDR circuitry 8 is applied to conventional forward error correction (FEC) decoder circuitry 9 which provides the output 10 of the receiver.

The receiver shown in FIG. 1 efficiently receives and decodes DPSK optical signals, provided that the DLI 1 is correctly configured so that the delay in one arm, relative to the other, is set at one bit period with a high precision, so that when the phase difference between the optical signals in successive bit periods is zero, the signals accurately cancel at the difference output 5 and when the phase difference is π radians, they accurately cancel at the sum output 4. Clearly, if the delay is set wrongly by an amount corresponding to a phase shift of π radians, the outputs will be totally wrong, since when the phase difference between the optical signals in successive bit periods is zero, the signals will cancel at the sum output 4, because of the phase shift of π radians introduced by the error in configuration of the DLI. That is an extreme case, but if the delay is set wrongly by a smaller amount, the detection will be less decisive and the error rate will increase.

Some way of controlling the delay in the DLI is therefore required. DLIs are known in which the delay is adjustable, for example by means of temperature control or piezo-electric deformation, but the problem is to provide a suitable control signal to detect errors in the configuration of the DLI, and particularly, to distinguish them from other sources of error in the received signal, such as dispersion and noise.

Figure 2:
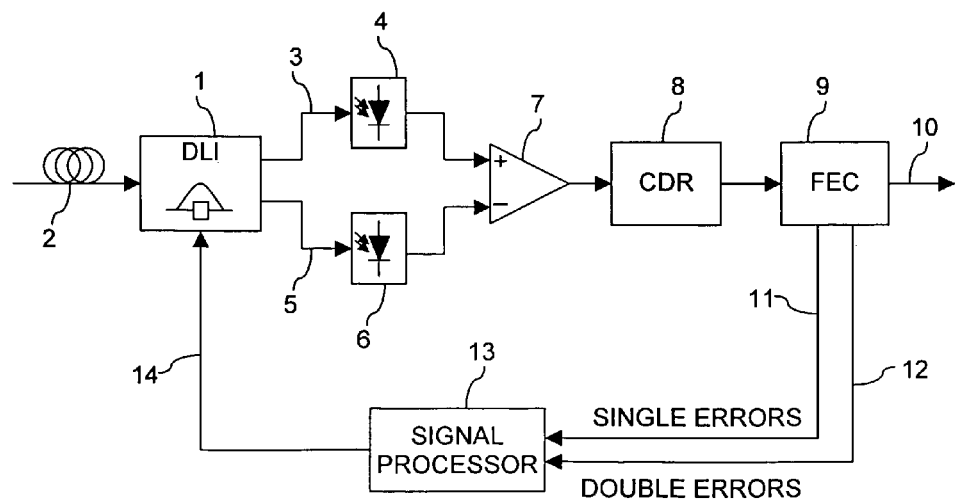
FIG. 2 shows a DPSK receiver embodying the present invention.

FIG. 2 shows the receiver of FIG. 1 modified according to an embodiment of the invention. The FEC circuitry 9 is modified to produce further outputs 11 and 12 corresponding to the rates of occurrence of detected errors and detected double errors respectively. Since the FEC circuitry detects errors as part of its conventional function, it is a simple matter to extract such data. The outputs 11 and 12 are supplied to a signal processor which calculates the ratio of the rate of occurrence of detected double errors to the rate of occurrence of detected errors and derives a control signal 14 for tuning the delay of the DLI as will be described below.

The rate of occurrence of detected errors is proportional to $$P_{err1}=P(e_n)$$

where $P(e_n)$ is the probability that an error is detected in any given bit n. The rate of occurrence of detected double errors is proportional to $$P_{err2}=P(e_{n+1}, e_n)$$

where $P(e_{n+1}, e_n)$ is the probability that errors will be detected in any given pair of successive bits n and n+1. Since $$P(e_{n+1}, e_n)=P(e_{n+1}|e_n) \times P(e_n)$$

where $P(e_{n+1}|e_n)$ is the conditional probability that an error will be detected in a bit n+1 given that an error was detected in the immediately preceding bit n, the ratio of $P_{err2}$ and $P_{err1}$ is equal to the conditional probability $P(e_{n+1}|e_n)$ $$P_{err2}/P_{err1}=P(e_{n+1}|e_n).$$

If the detected errors were uncorrelated, the conditional probability $P(e_{n+1}|e_n)$, and therefore the ratio $P_{err2}/P_{err1}$, would be equal to the single error probability $P(e_n)$, but it is known that in DPSK systems, and differentially encoded systems generally, errors tend to occur in pairs, as has been shown experimentally and theoretically by J. Salz and B. R. Saltzberg, in 'Double Error Rates in Differentially Coherent Phase Systems', *IEEE Transactions on Communications Systems*, vol. 12, pp. 202-205, June 1964.

Figure 3:
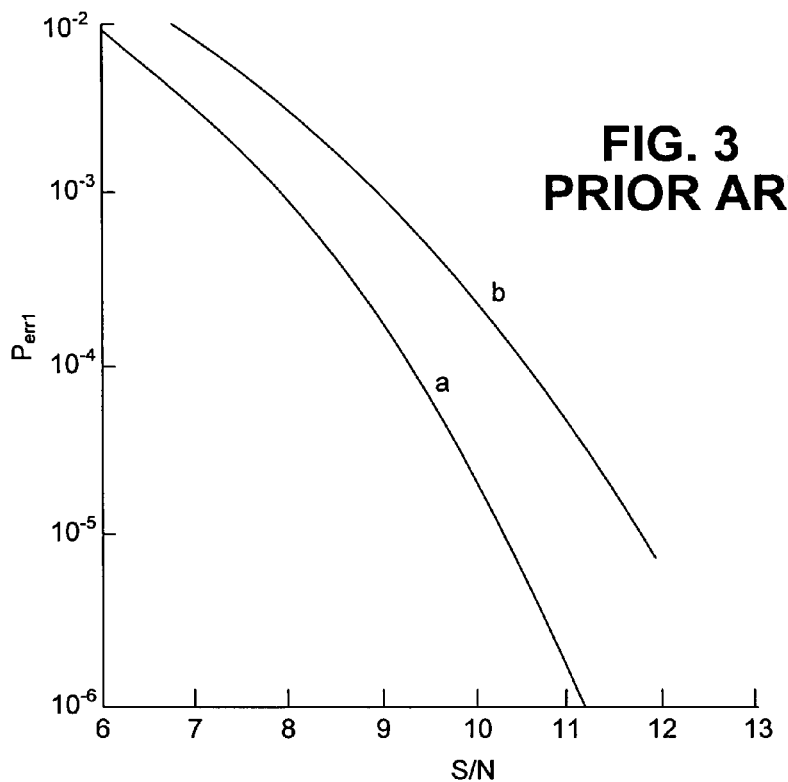
FIG. 3 shows some published results for the occurrence of errors in a DPSK receiver and its dependence on the signal to noise ratio.
Figure 4:
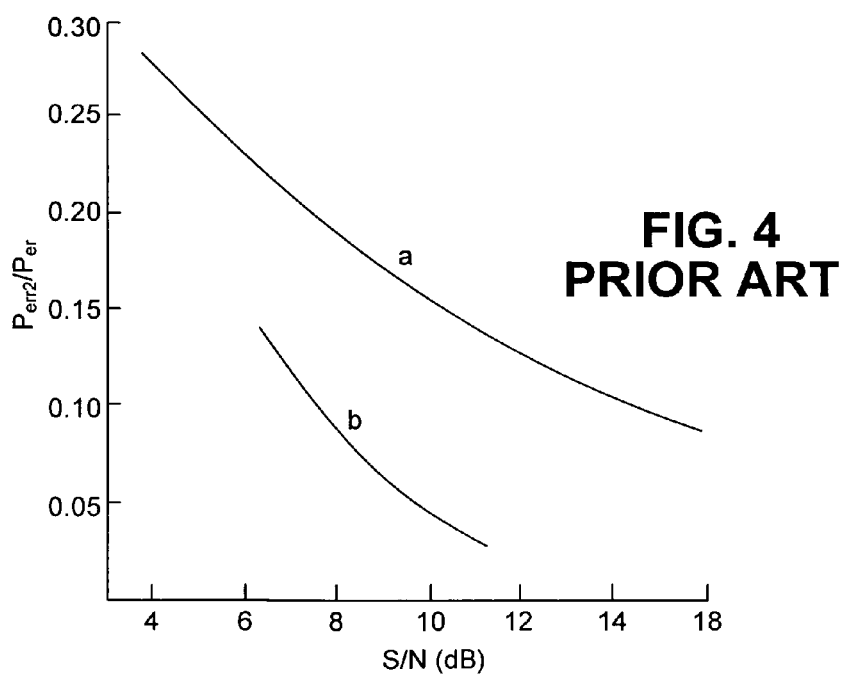
FIG. 4 shows some published results for the occurrence of double errors in a DPSK receiver and its dependence on the signal to noise ratio.

FIGS. 3 and 4 show the single error rate $P_{err1}$ and the conditional error rate (i.e. the ratio $P_{err2}/P_{err1}$) respectively as dependent on signal to noise ratio in a DPSK system as determined by Salz et al. In both Figures, curve a represents the result of the theoretical treatment and curve b represents experimental results. It is clear that the conditional error rate is considerable greater than the single error rate and that both depend on the signal to noise ratio.

We have found that the ratio $P_{err2}/P_{err1}$ has a characteristic behavior as the delay of the DLI is varied close to the correct value, and that this behavior is maintained over a wide range of signal to noise ratio as well as residual dispersion, which is usually present in optical transmission systems.

Figure 5:
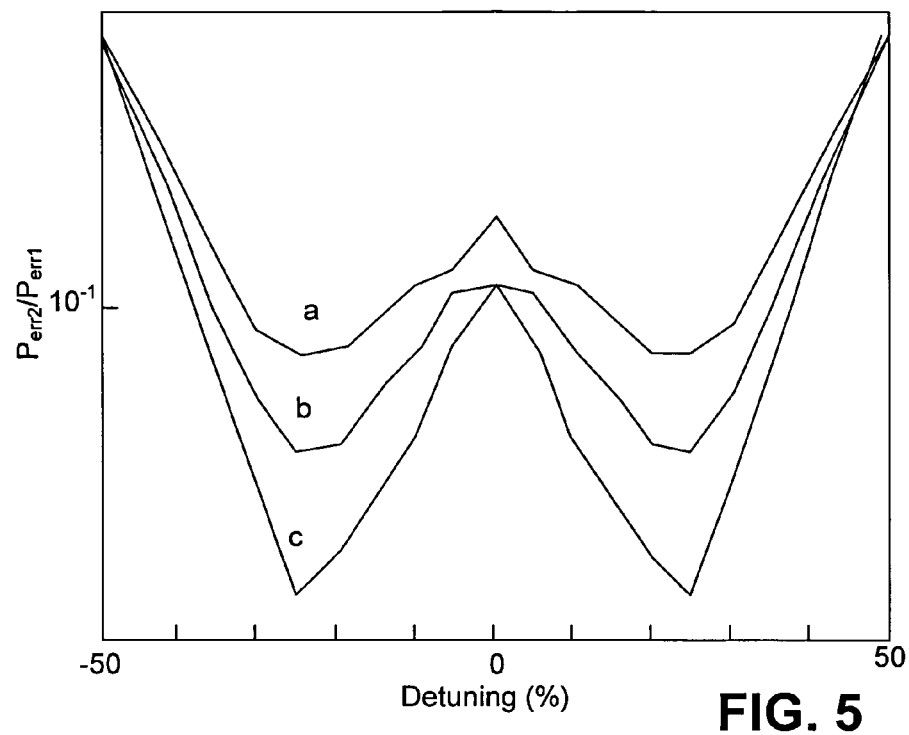
FIGS. 5-7 show the results of our calculations for the dependence of the occurrence of double errors on DLI detuning under a variety of conditions.
Figure 6:
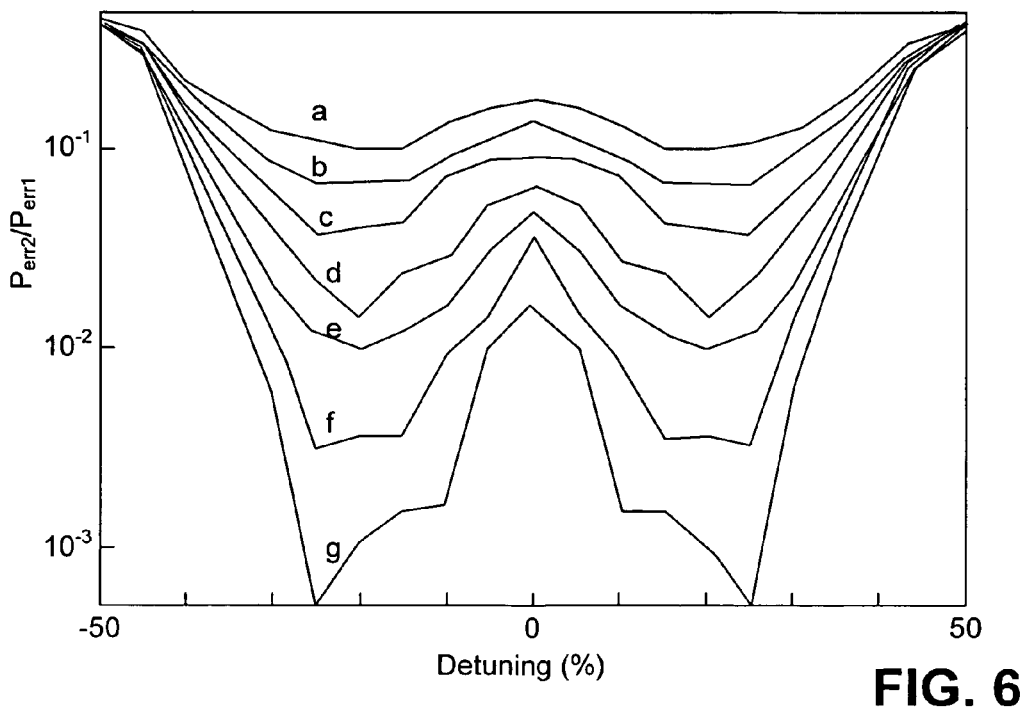
Figure 7:
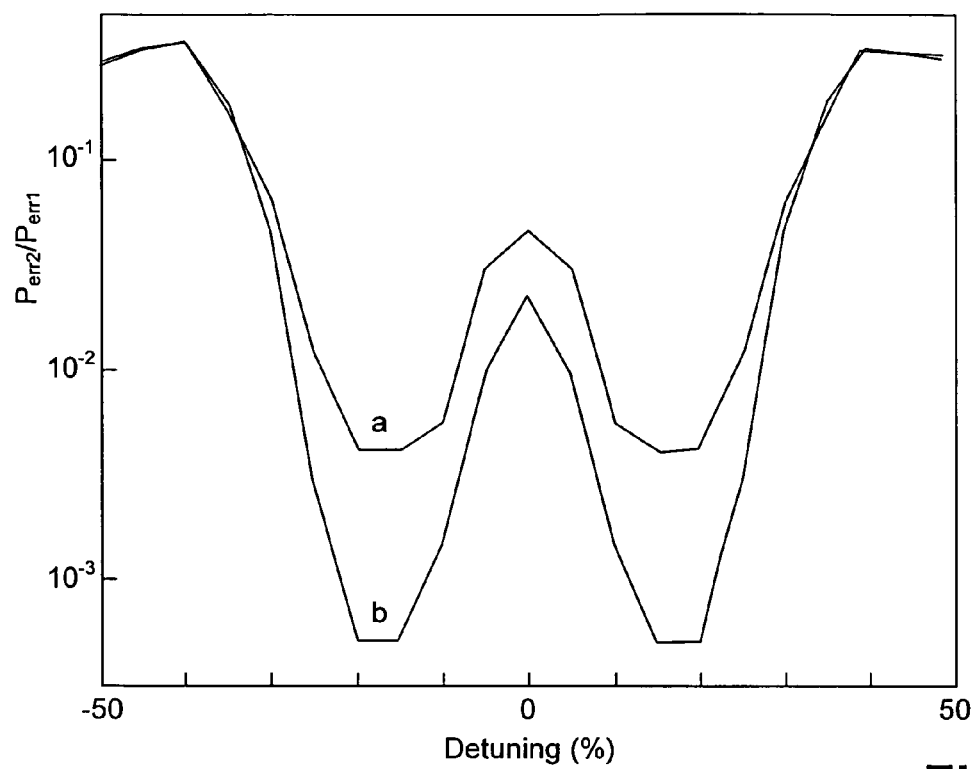

FIGS. 5-7 show the results of computer Monte-Carlo simulations for the ratio $P_{err2}/P_{err1}$ as a function of the detuning of the delay of the DLI for varying amount of residual dispersion and signal to noise ratio. FIG. 5 shows the results for zero residual dispersion. Curve a represents a signal to noise ratio of 8 dB, curve b a signal to noise ratio of 9 dB and curve c a signal to noise ratio of 10 dB. FIG. 6 shows the results for a residual dispersion of 50 ps/nm. Curves a-g represent signal to noise ratios of 8-14 dB respectively, in steps of 1 dB. FIG. 7 shows the results for a residual dispersion of 100 ps/nm. Curves a and b represent signal to noise ratios of 18 dB and 20 dB respectively.

In all cases, the ratio $P_{err2}/P_{err1}$ shows a characteristic W-shaped structure, consisting of a local maximum at the zero detuning point, with two closely adjacent minima, one on each side of the maximum. Thus, the zero detuning point is clearly distinguished by three distinct points in the $P_{err2}/P_{err1}$ curve: two dips and one peak.

It can be seen from FIGS. 5-7 that this behavior in principle does not change at different OSNR values/different residual dispersion values. The latter is particularly important as a tunable dispersion compensator (TDC) is a component that is typically also controlled by bit error feedback.

This behavior is to be compared with that of the simple bit error rate (BER) $P_{err1}$, which simply has a minimum at the zero detuning point, and whose behavior also depends on the OSNR and residual dispersion. At setup, the signal processor 13, which may be implemented as a stored-program signal processor, scans the DLI delay setting whilst monitoring the ratio $P_{err2}/P_{err1}$. Thus the characteristic W-shaped structure can be easily identified, and the optimum setting of the DLI rapidly found.

The invention has been particularly described in relation to the detection of optical DPSK signals, but it can be applied to other modulation formats, such as DQPSK. In DQPSK, two DLIs are employed, one to detect phase shifts of 0 and π radians and the other to detect phase shifts of π/2 and −π/2 radians. Thus, there are two zero detuning points to find. Also, each of the four possible outputs corresponds to two bits, so the error rates that need to be monitored are the rates of occurrence of errors in two-bit symbols and of errors in successive pairs of two-bit symbols. One possibility would be to monitor all symbols and symbol pairs and to search for the zero detuning points of the DLIs jointly, by searching the two-dimensional space spanned by the delays of the two DLIs. Alternatively, since one of the DLIs detects one set of symbols (e.g., '00' and '01') and the other of the DLIs detects another set of symbols (e.g., '10' and '11') the symbol errors can be classified according to whether the symbol was detected by one DLI or the other. Thus separate error rates $P_{err1}$ and double error rates $P_{err2}$ can be derived for the two DLIs, and separate control signals can be derived from the respective $P_{err2}/P_{err1}$ ratios. In this case, though the derivation of the control signals is more complex, the zero detuning points can be found by simultaneously searching in two one-dimensional spaces, rather than searching in a two-dimensional space.

Also, the invention can be applied to the encoding of ODB signals since, as has been previously noted, such signals can be produced by applying DPSK signals to a DLI and taking the sum output and, in fact, ODB signals are an intermediate product of a DPSK decoder, appearing at the sum output 3 of the DLI of FIGS. 1 and 2. Of course, since in the case of ODB signals, the adjustment takes place at the encoder end (i.e., prior to transmission, rather than subsequent to transmission) since the DPSK decoding is actually a part of the ODB encoding, the correct data are available, independently of any forward error correcting code, so the error rate and double error rate can be determined by comparing the correct data directly with the DPSK decoded data.

We claim:

1. A method of controlling the delay setting of an optical delay line interferometer used to decode differentially encoded phase shift keyed signals, said method comprising:
   determining the rate of occurrence of errors $P_{err1}$ in the decoded signals;
   determining the rate of occurrence of double errors $P_{err2}$ in the decoded signals;
   deriving a control signal representative of the ratio $P_{err2}/P_{err1}$ of the determined rates; and
   using said control signal to control said delay setting.

2. The method of claim 1, wherein said differentially encoded phase shift keyed signals are DPSK signals, said errors are single bit errors and said double errors are errors in two consecutive bits.

3. The method of claim 2, wherein said decoding of said DPSK signals provides optical duobinary signals for transmission.

4. The method of claim 1, wherein said differentially encoded phase shift keyed signals are DQPSK signals, said errors are errors in symbols and said double errors are errors in two consecutive symbols.

5. The method of claim 1, wherein said differentially encoded phase shift keyed signals carry data encoded with an error correcting code to enable error correction, wherein said determining the rates of occurrence of errors and of double errors includes detecting said errors in the course of said error correction.

6. The method of claim 1, wherein said using said control signal includes scanning the delay of said delay line interferometer and locating a structure in said control signal consisting of a local maximum with two adjacent minima, one each side of said maximum.

7. Apparatus for controlling the delay setting of an optical delay line interferometer used to decode differentially encoded phase shift keyed signals, said apparatus comprising:
   means for determining the rate of occurrence of errors $P_{err1}$ in the decoded signals;
   means for determining the rate of occurrence of double errors $P_{err2}$ in the decoded signals;
   means for deriving a control signal representative of the ratio $P_{err2}/P_{err1}$ of the determined rates; and
   means for using said control signal to control said delay setting.

8. The apparatus of claim 7, wherein said differentially encoded phase shift keyed signals are DPSK signals, said errors are single bit errors and said double errors are errors in two consecutive bits.

9. The apparatus of claim 8, wherein said decoding of said DPSK signals provides optical duobinary signals for transmission.

10. The apparatus of claim 7, wherein said differentially encoded phase shift keyed signals are DQPSK signals, said errors are errors in symbols and said double errors are errors in two consecutive symbols.

11. The apparatus of claim 7, wherein said differentially encoded phase shift keyed signals carry data encoded with an error correcting code to enable error correction, wherein said determining the rates of occurrence of errors and of double errors includes detecting said errors in the course of said error correction.

12. The apparatus of claim 7, wherein said means for using said control signal comprises means for scanning the delay of said delay line interferometer and locating a structure in said control signal consisting of a local maximum with two adjacent minima, one each side of said maximum.

* * * * *